3,271,325
CATALYTIC COMPOSITIONS FOR USE IN STEAM REFORMING OF HYDROCARBONS
Phineas Davies, Norton-on-Tees, and Cecil Michael Stone, Reigate, Surrey, England, assignors to Imperial Chemical Industries Limited, London, England, a corporation of Great Britain
No Drawing. Filed Sept. 6, 1962, Ser. No. 221,898
Claims priority, application Great Britain, Sept. 11, 1961, 32,491/61
19 Claims. (Cl. 252—466)

The present invention relates to alumina containing material useful as, or convertible to, catalysts particularly for the steam reforming of hydrocarbons.

It is an object of the present invention to porvide an alumina containing material of good mechanical strength suitable for use as such, as a catalyst, or as a support for a steam reforming catalyst, to provide a composition suitable for use as a precursor of such material, a steam reforming catalyst derived from the material and a process of steam reforming using this catalyst.

Thus according to the invention there is provided a composition suitable for use as a precursor of an alumina containing material which composition comprises a hydrate of alumina, aluminum and a compound of a metal of Groups I, II, III and VIII of the Periodic Table.

The hydrate of alumina may be alumina trihydrate or a lower alumina hydrate, for instance prepared by heating alumina trihydrate.

Conveniently the aluminum is present in a particulate form such as a powder.

Preferably the metal compound is a compound capable of being converted to the oxide of the metal on heating. The hydroxides, carbonates and nitrates are preferred, and more particularly the carbonates and nitrates, but bicarbonates and salts of organic acids for example formates and oxalates may also be used.

Of the metals, potassium and sodium from Group I, magnesium and calcium from Group II, aluminum from Group III, and from Group VIII nickel and the platinum group metals, i.e., ruthenium, rhodium, palladium, osmium, iridium and platinum are particularly useful.

Thus examples of compounds suitable for use in the precursor composition hereinbefore defined are potassium hydroxide, sodium carbonate, aluminum nitrate, nickel nitrate and rhodium nitrate.

The precursor composition defined above may be prepared by mixing together an alumina hydrate, aluminum, and a compound of a metal of Groups I, II, III and VIII of the Periodic Table.

According to another feature of the invention there is provided a process for preparing an alumina containing material which process comprises heating the above defined composition to a temperature of between 400° C. and 850° C., preferably between 500° C. and 750° C. Optionally the heating is carried out in the presence of steam. Under these conditions the aluminum and the alumina hydrate are at least partially converted in the presence of steam to gamma alumina and the compound of the metal is at least partially converted either to the metallic oxide or to the metal.

The process defined above affords a strong alumina containing material suitable for use as a catalyst for example in processes of dehydration or for effecting polymerisation reactions, or more particularly as a support for catalysts for use in hydrocarbon steam reforming process, when this alumina containing material helps to increase the resistance of the catalyst to mechanical wear and disintegration.

Thus according to a further feature of the invention there is provided a steam reforming catalyst composition comprising an alumina containing material prepared by the process defined above, and containing nickel present as metallic nickel or a compound of nickel present as metallic nickel or a compound of nickel reducible thereto, and/or a platinum group metal present as the metal or as a compound reducible thereto.

Rhodium is a convenient platinum group metal. The platinum group metal may be present in the catalyst composition in amounts ranging from 0.01% to 20% by weight based on the weight of the platinum group metal present after the catalyst composition has been calcined at a temperature of 900° C. For economic reasons it is advantageous to use small amounts of the platinum group metal, and 0.1% to 5% by weight thereof are found to be very suitable.

The catalyst composition may conveniently contain from 3.0% to 80% preferably from 5% to 30% by weight of nickel calculated as nickel oxide, present in the catalyst composition after calcination at 900° C., and from 99.9% to 20% of alumina after calcination at the same temperature. Incorporation of small amounts of the platinum group metal, preferably 0.01% to 5% by weight into steam reforming catalyst compositions as hereinbefore defined containing nickel is useful.

The steam reforming catalyst composition hereinbefore defined may be prepared in a variety of ways, and the nickel and the platinum group metal constituents of the composition may be incorporated at various stages in its preparation.

In one method the nickel and/or the platinum group metal constituents are present in the alumina containing material precursor composition defined above. In another method these constituents may be added to the alumina containing material after its formation from its precursor composition, for example the alumina containing material may be impregnated with a solution of a salt of the metal. Examples of suitable nickel and platinum group metal compounds are nickel nitrate and rhodium nitrate.

In order to reduce the formation of carbon in a steam reforming process it is useful to have present in the catalyst compositions an alkali metal or alkaline earth metal compound, conveniently in an amount calculated as the metallic oxide equivalent to at least 0.5% by weight of $K_2O$, and preferably at least 1% of the sum of the weight of the other constituents of the composition calculated as aforesaid. Usually and desirably the amount of alkali or alkaline earth metal compound does not exceed an amount equivalent to 11% by weight of potassium oxide. A mixture of alkali metal and/or alkaline earth metal compounds can be used. In this event the proportion of each alkali and alkaline earth metal compound is stated as the equivalent amount of potassium oxide expressed as aforesaid, and these amounts are summed. Conveniently the alkali or alkanine earth metal compound is the oxide or a compound which is capable of being decomposed to the oxide under the conditions used for instance for the reduction of the nickel compound or in steam reforming or a compound which is alkaline to litmus in aqueous solution. The hydroxide and carbonates are preferred, but the nitrates and bicarbonates may also be used.

Preferably because it is more effective an alkali metal is used and potassium and sodium are preferred because of their effectiveness, when this is considered in conjunction with their reasonable cost.

The alkali metal or alkaline earth metal compound may be incorporated in the catalyst composition in a number of ways and at various stages in its preparation.

Thus in one method as described in more detail in Example 1 herein the alkali metal or alkaline earth metal compound may be present as a component of the precursor composition for the alumina containing material.

In another method, described in more detail in Example 3 herein, applicable where the alkali metal or alkaline earth metal compounds are soluble in water, the compounds may be added to the alumina containing material as a solution of their salts. For example the alumina containing material may be impregnated by contacting them with the solution of the salt.

The preferred catalyst composition can be activated by heating it in a current of hydrogen or during use in a steam reforming process, whereby for instance nickel oxide is reduced to nickel and/or the platinum group metal compound is reduced to the metal.

A catalytic composition as above is particularly suitable for use in a steam reforming process.

Thus the invention provides a process of steam reforming hydrocarbons boiling at temperatures up to 350° C. and preferably in the range 30° C. to 350° C. by reacting the hydrocarbons with steam at an elevated temperature in the presence of the above defined catalytic composition to yield mixed gases including CO and $H_2$.

The preferred application of the process is to substantially saturated hydrocarbons, but it may also be applied to a saturated hydrocarbon containing also a minor amount, e.g., up to 20% of unsaturated or aromatic hydrocarbons. It is particularly useful, in its preferred form when alkali metal or alkaline earth metal compounds are used, for steam reforming normally liquid hydrocarbons under conditions, e.g., low steam ratios, where carbon deposition tends to occur. Thus, a straight run petroleum distillate boiling in the range 30° C. to 220° C. may be used, or even up to 270° C. Liquefied petroleum gases and natural gases may also be used as feedstock. The product may contain besides CO and $H_2$ up to 38%, e.g., 8% to 20% by volume of $CO_2$.

The temperature may conveniently be in the range 500° C. to 1000° C.; 600° C. to 900° C. is particularly suitable. The pressure may be for instance between 1 and 50 atmospheres absolute; 1 to 25 atmospheres absolute is particularly convenient. The invention may also be applied to the production of $CH_4$ containing gases from non-methane feedstocks by operating under the conditions described above, except that temperatures in the range of 550° C. to 750° C. and pressures above 100 p.s.i.g. and low steam ratios such as 1.5 to 4 particularly 2 to 3 are used while the space velocity is kept sufficiently low to convert substantially all of the feedstock.

In steam reforming, the appropriate operating temperature is dependent on the pressure used and the composition of the gas which it is desired to obtain as a product of the process. In practice to obtain product gases having a high proportion of $H_2$ and CO, a temperature of 700° C. to 800° C. is generally convenient. The steam ratio may be, for example, between 1.5 and 6, and is preferably between 2 and 5; if the steam ratio is below about 5 however it is preferred to have present an alkali metal or alkaline earth metal compound to reduce carbon formation.

By the term steam ratio is meant the number of molecules of steam employed per atom of carbon in the reacting hydrocarbons.

The invention is further illustrated and described by the following examples.

*Example 1*

570 gms. of $Al_2O_3 \cdot H_2O$ obtained by heating alumina trihydrate at 450° C. for 4 hours, 63 gms. of sodium carbonate, 70 gms. of aluminum powder passing British standard sieve 200, and 14 gms. of graphite powder (as a binder) were throroughly mixed and compressed into small pellets. The pellets were crushed and the resulting coarse powder was compressed into 3/16" x 3/16" pellets.

These pellets were heated in nitrogen to 300° C. and thereafter in steam to 750° C. for 3 hours. The pellets were immersed in water to convert the unchanged aluminum, e.g., 24 hours. They were then dired at 120° C. X-ray examination of the samples showed them to comprise largely gamma with some chi alumina and aluminum metal. The strength of such pellets was as follows:

Mean vertical crushing strength _____ 347 lbs. (range 290–410 lbs.)
Mean horizontal crushing strength __ 32 lbs. range 1–43 lbs.).

Micromeritic data:
 Surface area, m.$^2$/gm. _____ 102
 True density, gm./cc. _____ 327
 Particle density, gm./cc. _____ 158
 Pore volume cc./gm. _____ 0.327
 Pore radius, A. ° _____ 64

The dried pellets were then dipped into a solution of rhodium trichloride containing 0.4 gm. of rhodium per 100 mls. and afterwards dried at 120° C. The pellets so prepared had the following percentage composition by weight:

|  | Percent |
|---|---|
| $Na_2O$ | 2.4 |
| Rh | 0.08 |
| $Al_2O_3$ | 97.52 |

Light distillate boiling at 30° C. to 170° C. and containing substantially no sulphur was vaporised at a rate of 50 ml./hr. and mixed with steam from a water feed at 228 mls./hr. The mixture which had a steam ratio as defined aforesaid of 5 was fed to a tube containing 5 mls. of a steam reforming catalyst prepared as described above. The tube was uniformly heated in a furnace so that the temperature of the issuing gas was 800° C. The pressure at the exit of the reformer was atmospheric. Under these conditions there was an almost 100% conversion of the light distillate to gas which was produced at a rate of 201 liters/hr. with no deposition of carbon. The resulting gas had the following composition by volume:

| | |
|---|---|
| $CO_2$ | 13.8 |
| CO | 14.1 |
| $H_2$ | 69.5 |
| $CH_4$ | 1.8 |
| $C_nH_{2n}$ | <0.1 |
| $O_2$ | <0.1 |

*Example 2*

500 gms. of ball milled $Al_2O_3 3H_2O$, 25 gms. of aluminum powder, 50 gms. of potassium hydroxide passing British standard sieve 30, and 18 gms. of graphite were thoroughly mixed and then granulated with 230 mls. of water. The granules were dried and thereafter compressed into small pellets. The pellets were immersed in water to convert the unchanged aluminum. They were then fired at 600° C. to give pellets having a mean vertical crushing strength (M.V.C.S.) of 278 lb. (range 120–440 lb.), 132 gms. of this alumina (largely gamma with some chi alumina) were impregnated with 42 mls. of a solution of rhodium chloride containing 0.66 gm. of rhodium. The pellets were then dried at 120° C. The pellets prepared above were used as the catalyst in a process of steam reforming substantially sulphur free light distillate, boiling at 30° C. to 170° C., in which the light distillate was vaporised at a rate of 50 mls./hr. and mixed with steam from a water feed at 222 mls./hr., so that the mixture had a steam ratio of 5, before being passed over the catalyst pellets contained in a tube of 1" internal diameter. The tube was uniformly heated in a furnace so that the temperature of the exit gas was 800° C. The pressure at the exit of the reformer was atmospheric. Under these conditions there was 100% conversion of the light distillate to gas which was produced at a rate of 171 liters/hr.

with little or no deposition of carbon. The gas had the following composition by volume:

| | |
|---|---|
| $CO_2$ | 11.0 |
| CO | 18.2 |
| $CH_4$ | 3.1 |
| $H_2$ | 65.3 |
| $C_2H_{2n}$ | 1.0 |
| $O_2$ | <0.1 |

*Example 3*

550 gms. of ball milled $Al_2O_3 \cdot 3H_2O$ and 42 gms. of aluminum powder were thoroughly mixed and thereafter granulated with 150 mls. of solution containing 213 gms. of $Ni(NO_3)_2 \cdot 6H_2O$. The mixture was dried at 120° C., mixed with 13 gms. graphite and compressed to give $3/16''$ internal diameter pellets. The pellets were fired at 300° C. for 6 hours, then cooled and soaked in water for four hours. Little reaction took place. The pellets had a crushing strength (M.V.C.S.) of 202 lb. After drying at 120° C. the pellets were soaked in 10% potassium hydroxide solution. The impregnated pellets were thereafter dried and fired at 600° C. for four hours. The pellets were used as the catalyst in a steam reforming process similar to the processes outlined in Examples 1 and 2. The experimental conditions and results are summarised in the table given below.

| | |
|---|---|
| Temperature, °C | 800 |
| Pressure, atmosphere | 1 |
| Light distillate feeds, msl./hr | 50 |
| Water feeds, mls./hr | 228 |
| Steam ratio | 5 |
| Exit gas: | |
| Rate, liters/hour | 185 |
| Analysis, percent— | |
| $CO_2$ | 12.1 |
| CO | 16.1 |
| $CH_4$ | 2.6 |
| $H_2$ | 66.7 |
| $C_nH_{2n}$ | 0.9 |
| $O_2$ | 0.3 |
| Conversion of light distillate to gas, percent | 100 |

There was little or no deposition of carbon.

*Example 4*

15 kilograms of ball milled $Al_2O_3 \cdot 3H_2O$ and 1.875 kilograms of aluminum powder were mixed together for 15 minutes and then 3 liters of a solution containing 2.25 kilograms of aluminum nitrate was added slowly. The paste was then dried at 120° C. for 24 hours, oscillated through a $1/16''$ mesh and then mixed with 2½% by weight of graphite. A portion of this mixture was compressed into rings (0.66 inch outer diameter, 5 mm. wall thickness) which were then fired at 450° C. for 6 hours, and thereafter cooled and soaked in water for 48 hours. The rings were dried at 100° C. for 24 hours. After a final firing at 600° C. the rings had a crushing strength (M.H.C.S.) of 100 lb. (range 100–145 lb.). The rings were then steamed at 750° C. for 24 hours following by reduction in steam and hydrogen also at 750° C. for a further 24 hours. The decrease in strength and dimensions is compared with a known cement-bound catalyst in the table given below.

| M.H.C.S. | Rings as prepared above | Cement-bound catalyst |
|---|---|---|
| Before test | 95 | 132 |
| After test | 60 | 59 |
| Percent decrease | 37 | 58 |
| Percent loss in weight | 6.7 | 12.6 |
| Percent linear shrinkage | 0 | 0.5 |

The alumina based rings are more resistant to reaction conditions, lose less weight, and undergo negligible shrinkage in use.

Micromeritic data on the alumina rings prepared as above was as follows:

| | |
|---|---|
| Surface area m.²/gm. | 139 |
| True density gm./cc. | 3.19 |
| Particle density gm./cc. | 1.62 |
| Pore volume cc./g. | 0.303 |
| Pore radius A. ° | 22 |

The remainder of the mixture was compressed into $3/16''$ internal diameter pellets, which were then fired at 450° C. to decompose the nitrates, cooled and thereafter soaked in water for a period of 48 hours. The pellets were then dried at 120° C. and heated in air at 600° C. to convert to alumina (largely gamma alumina). These alumina pellets were then used as the support for steam reforming catalysts A, B and C prepared in the manner described respectively in paragraphs a, b, and c below.

(a) *Catalyst A.*—Alumina pellets prepared as above were soaked in a 15% sodium carbonate solution for 30 minutes and then dried at 120° C. 150 gms. of the treated pellets were then immersed in 50 mls. of solution containing 1.9 gms. of rhodium chloride. After drying at 120° C. and firing at 500° C. for 6 hours the pellets had the following crushing strengths.

M.V.C.S. _____ 793 lb. (range 730–800 lb.).
M.H.C.S. _____ 62 lb.

The catalyst had the following percentage composition by weight.

| | |
|---|---|
| Rh | 0.35 |
| $Na_2O$ | 2.0 |
| $Al_2O_3$ | 97.65 |

(b) *Catalyst B.*—The pellets were soaked for 1 hour in 10% potassium hydroxide and the impregnated pellets were thereafter treated with sufficient rhodium chloride solution to completely wet the pellets without excess being present. They were then dried at 120° C. and fired at 500° C. for 6 hours. The pellets had the following properties:

Crushing strength:
| | |
|---|---|
| M.V.C.S., lb. | 800 |
| M.H.C.S., lb. | 113 |

Percent composition by weight:
| | |
|---|---|
| Rh | 0.4 |
| $K_2O$ | 3.9 |
| $Al_2O_3$ | 95.7 |

(c) *Catalyst C.*—The alumina pellets produced as above were soaked for 20 minutes in 100 mls. of nickel nitrate solution containing 30 gms. Ni, the solution being maintained at a temperature of 95° C. After drying and firing at 450° C. the pellets were re-impregnated and fired as above. They were then immersed for 10 minutes in a 20% solution of potassium hydroxide. After draining and drying at 120° C. the pellets had crushing strengths of:

M.V.C.S. _____ 795 lb. (range 740–800 lb.).
M.H.C.S. _____ 95 lb. (range 24–140 lb.).

The catalyst prepared in this manner had the following percentage composition by weight.

| | |
|---|---|
| NiO | 15.0 |
| $K_2O$ | 2.4 |
| $Al_2O_3$ | 82.6 |

The alumina based catalysts A, B and C were then used in a steam reforming process similar to that described in Example 1. The experimental conditions and the results obtained are summarized in the table below.

There was little deposition of carbon with any of the three catalysts.

| Catalyst | A | B | C |
|---|---|---|---|
| Temperature, °C | 700 | 700 | 700 |
| Light distillate feed (mls./hr.) | 25 | 25 | 25 |
| Water feed (mls./hr.) | 114 | 114 | 114 |
| Steam ratio | 5 | 5 | 5 |
| Exit gas: | | | |
| Rate, liters/hr | 90 | 58 | 80 |
| Analysis, percent— | | | |
| $CO_2$ | 12.8 | 15.5 | 13.4 |
| $CO$ | 15.2 | 11.0 | 14.0 |
| $CH_4$ | 2.1 | 2.2 | 2.7 |
| $H_2$ | 68.6 | 67.9 | 67.2 |
| $C_nH_{2n}$ | 0.8 | 2.5 | 2.6 |
| $O_2$ | 0.1 | 0.1 | 0.1 |
| Conversion, percent | 98 | 72 | 82 |

We claim:

1. A precursor composition for an alumina containing material, for use in catalysts, consisting essentially of a hydrate of alumina, aluminum, and a compound of a metal selected from the group consisting of aluminum and metals of Groups I, II and VIII of the Periodic Table.

2. A precursor composition as claimed in claim 1 in which the hydrate of alumina is alumina trihydrate.

3. A precursor composition as claimed in claim 1 in which the hydrate of alumina is a lower hydrate prepared by heating alumina trihydrate.

4. A precursor composition as claimed in claim 1 in which the compound of a metal is selected from the group consisting of magnesium, calcium, aluminum, nickel, and platinum group metal nitrates, hydroxides and carbonates.

5. A precursor composition as claimed in claim 1 in which the compound of a metal is selected from the group consisting of alkali metal and alkaline earth metal oxides, hydroxides and carbonates.

6. A precursor composition as claimed in claim 5 in which the compound of a metal is selected from the group consisting of sodium hydroxide, sodium carbonate, potassium hydroxide and potassium carbonate.

7. A precursor composition as claimed in claim 5 in which there is present in addition to the said compound of a metal; a compound selected from the group consisting of magnesium, calcium, aluminum, nickel and platinum group metal nitrates, hydroxides and carbonates.

8. An alumina containing material which is the heat recreation product obtained by heating a precursor composition consisting essentially of a hydrate of alumina, aluminum, and a compound of a metal selected from the group consisting of aluminum and metals of Groups I, II and VIII of the Periodic Table to a temperature of between 400° C. and 850° C. whereby the alumina hydrate and aluminum are at least partly converted to gamma alumina.

9. A steam reforming catalyst composition consisting essentially of an alumina containing material which is the heat reaction product obtained by heating a precursor composition consisting essentially of a hydrate of alumina, aluminum, and a compound of a metal selected from the group consisting of aluminum and metals of Groups I, II and VIII of the Periodic Table to a temperature of between 400° C. and 850° C. whereby the alumina hydrate and aluminum are at least partly converted to gamma alumina, and a catalytic material selected from the group consisting of nickel containing materials, platinum group metal containing material, and nickel and platinum group metal containing materials.

10. A steam reforming catalyst composition as claimed in claim 9 in which there is also present an alkali metal compound.

11. A steam reforming catalyst composition as claimed in claim 9 in which there is also present an alkaline earth metal compound.

12. A process for preparing an alumina containing material which comprises heating a precursor composition consisting essentially of a hydrate of alumina, aluminum, and a compound of a metal selected from the group consisting of aluminum and metals of Groups I, II and VIII of the Periodic Table to a temperature of between 400° C. and 850° C.

13. A process as claimed in claim 12 in which the precursor composition is heated in the presence of steam to a temperature of between 500° C. and 750° C.

14. A process for preparing an alumina containing material which process comprises mixing together a hydrate of alumina, aluminum, and a compound selected from the group consisting of alkali metal and alkaline earth metal compounds, shaping the mixture and heating the shaped material to a temperature of between 600° C. and 800° C.

15. A process as claimed in claim 14 in which the heating is carried out in the presence of steam.

16. A process for preparing a catalyst composition comprising the steps of mixing together an alumina hydrate, aluminum and a compound of a metal selected from the group consisting of alkali metal and alkaline earth metal oxides, hydroxides and carbonates to provide a precursor composition, shaping said precursor composition and then heating in the presence of water to a temperature between 400° C. and 850° C. to provide an alumina containing material, wherein said alumina hydrate and aluminum are at least partially converted to gamma alumina, then impregnating said alumina containing material with a solution of a compound of a metal of Group VIII of the Periodic Table, and drying said impregated alumina containing material to provide said catalyst composition.

17. A process for preparing a catalyst composition comprising the steps of mixing together an alumina hydrate, aluminum and a compound of a metal selected from the group consisting of alkali metal and alkaline earth metal oxides, hydroxides and carbonates, shaping and immersing said alumina hydrate, aluminum and metal compound in an aqueous solution followed by heating to a temperature between 400° C. and 850° C. to provide an alumina containing material wherein said alumina hydrate and aluminum are at least partially converted to gamma alumina, and then impregnating said alumina containing material with solution of a compound of a metal of Group VIII of the Periodic Table, and drying said impregnated alumina containing material to provide said catalyst composition.

18. A process for preparing a catalyst composition comprising the steps of mixing together and then shaping an alumina hydrate, alumina and a compound of a metal of Group VIII of the Periodic Table to provide a precursor composition, heating said precursor composition in the presence of water to provide an alumina containing material wherein said alumina hydrate and aluminum are at least partially converted to gamma alumina, impregnating said alumina containing material with a solution of a compound of a metal selected from the group consisting of alkali metal and alkaline earth metal oxides, hydroxides and carbonates, followed by heating at a temperature between 400° C. and 850° C. to provide said catalyst composition.

19. A process for preparing a catalyst composition comprising the steps of mixing together and shaping an alumina hydrate, aluminum and a compound of a metal of Group III of the Periodic Table to provide a precursor composition, heating said precursor composition in the presence of water to a temperature between 450° C. and 800° C. to provide an alumina containing material wherein said alumina hydrate and aluminum are at least partially converted to gamma alumina, and then impregnating said alumina containing material with a solution of a compound of a metal selected from the group consisting of alkali metal and alkaline earth metal oxides, hydroxides and carbonates, and with a solution of a compound of a metal of Group VIII of the Periodic Table, and drying said impregnated alumina containing material to provide said catalyst composition.

References Cited by the Examiner

UNITED STATES PATENTS

| | | | |
|---|---|---|---|
| 1,173,532 | 2/1916 | Mittasch | 252—466 X |
| 2,249,613 | 7/1941 | Kinneberg | 252—455 X |
| 2,331,915 | 10/1943 | Kirkpatrick | 252—466 X |
| 2,840,514 | 6/1958 | Brennan et al. | 252—466 X |
| 2,840,619 | 6/1958 | Mason et al. | 252—466 X |
| 2,867,505 | 1/1959 | Bloch | 23—143 |
| 2,918,509 | 12/1959 | Miller | 252—455 X |
| 2,944,032 | 7/1960 | Nixon | 252—466 X |
| 2,972,644 | 2/1961 | Holmes et al. | 252—466 X |
| 2,982,719 | 5/1961 | Gilbert et al. | 252—463 X |
| 3,025,247 | 3/1962 | Oleck | 252—466 |
| 3,058,907 | 10/1962 | Van Nordstrand et al. | 208—138 |
| 3,071,537 | 1/1963 | Porter et al. | 208—65 |
| 3,098,829 | 7/1963 | White et al. | 252—466 |
| 3,119,667 | 1/1964 | McMahon | 252—474 X |
| 3,152,091 | 10/1964 | Gring | 252—466 X |

FOREIGN PATENTS 1,034,301  7/1958  Germany.

OSCAR R. VERTIZ, *Primary Examiner.*

MAURICE A. BRINDISI, BENJAMIN HENKIN, G. T. OZAKI, *Assistant Examiners.*